# UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD AND MEANS FOR PRODUCING TITANIUM TETRACHLORID, ($TiCl_4$.)

1,179,394.  Specification of Letters Patent.  Patented Apr. 18, 1916.

No Drawing.  Application filed June 24, 1914.  Serial No. 846,927.

*To all whom it may concern:*

Be it known that I, LOUIS E. BARTON, a citizen of the United States, residing at Niagara Falls, in the county of Niagara and State of New York, have invented certain new and useful Improvements in Methods and Means for Producing Titanium Tetrachlorid, ($TiCl_4$,) of which the following is a specification.

My invention relates to the production of titanium tetrachlorid, and, particularly, from comparatively impure titanic materials, as, for example, from titanic oxid ($TiO_2$) contaminated with undesired substances, such as iron oxids, and its objects include provision of procedures, and means whereby said tetrachlorid of purity, corresponding with that of the best laboratory samples derived from pure titanic compounds, may readily and profitably be produced in industrially important quantities, with greater certainty and rapidity, and by less skilled labor than formerly required for comparatively inferior products.

Titanium tetrachlorid has hitherto been produced by methods comprising the following procedures, viz: 1. By passing dry chlorin over powdered mixtures of $TiO_2$ with lamp black, while heated to full redness, and freeing the resulting titanium tetrachlorid from chlorin by shaking with copper, mercury, or sodium amalgam, or by boiling followed by distillation, which latter is sometimes conducted in dry nitrogen. 2. By passing a mixture of chlorin and carbon monoxid over small lumps of titanic oxid heated to bright redness, and freeing from chlorin as before. 3. In the laboratory, or on small scales, by passing chlorin over metallic titanium, or titanium carbid, or titanium cyano-nitrid, in lumps, or powdered, while heated to redness. The practice of these previous methods has proved imperfect, difficult, or prohibitively expensive, in industrial operations, for various reasons among which are, notable,—their dependence on the purity, or uncontamination, of the titanic materials treated, and mechanical difficulties attributable to the forms of the materials which, when in lumps, are not sufficiently, if at all, interiorly accessible by the chlorin, or, more frequently, because these even in the form of fine powder when supported as is usual on horizontal trays are scarcely more accessible interiorly, and are too prone to be disastrously blown off, or displaced, unless the flow of chlorin be inefficiently slow.

When the materials are treated in lumps, though a more rapid flow of chlorin is possible, without prohibitory disturbance, through interstitial passages between the lumps even when the furnace is full, there still is expensive, and undesirable, loss, of chlorin efficiency because of the impenetrability of the lumps themselves. On the other hand, when the materials are, as more frequently, in powdered form it is impossible to fill therewith the furnace without prohibitively clogging the flow of chlorin, and consequently resort to the expensive support of the mass of powder in shallow, readily disturbed, subdivisions, on horizontal trays, is indispensable. Moreover, method No. 2, above referred to, is also too expensive because requiring preliminary preparation of carbon monoxid gas and its mixture with chlorin, while as to method No. 3 the cost of producing the materials is also so great as to prohibit its use except in small operations for laboratory purposes.

The foregoing difficulties are largely avoided by the use of my method including as a means the novel titanic-cinder form thereby imparted to some of the materials as follows: For their treatment by the chlorin, I prepare the materials in the form of a cinder sufficiently strong and rigid to support, with but negligible collapse or crumbling, its own cumulative weight in the largest used masses, and yet so porous as to afford ready, rapid and complete, access of the chlorin to substantially all of the incorporated titanic material. In the production of this, my titanic cinder, I employ a powdered titaniferous material, say rutile ore for example, or, preferably, one of the crude, now manufactured titanic oxid concentrates, containing from say 85% to 90% of $TiO_2$, and 3% to 5% of iron oxid besides other impurities. Such a powdered titaniferous material I mix with a devolatilizable carbonaceous substance such as tar, pitch, asphaltum, bituminous coal, or the like, capable of yielding, when heated to redness without access of air, a coke-like residuum, or structure. I prefer to use for the purpose soft coal capable of yielding a strong coke having a low percentage of ash and as free as possible from iron. Such type of carbonaceous material not only imparts requisite strength to my cinder but also, what is equally important, requisite porosity, and is, I believe, at present, the cheapest material available for my purpose. I have for example, thus used very successfully a soft coal having by analysis the following composition, viz:

Volatile combustible matter _____ 39.82%
Fixed carbon _____ 55.78
Ash _____ 4.40
                                  _____
                                  100%

My researches have demonstrated that the best results are obtainable by proportioning the carbon constituent of my cinder at about 35% though some variations below, or particularly above, this percentage are not seriously detrimental. I therefore prepare the charge for producing my cinder by mixing the finely powdered titaniferous material and coal in proportions such, as, calculated from the analysis of the materials, will yield a cinder product analyzing about: 35% carbon, 65% ash, $TiO_2$, and impurities. This mixture I heat to redness in a suitable retort excluding access of air, until all volatile constituents have been expelled thus producing a hard, rigid, porous cinder, or magma, consisting chiefly of devolatilized porous carbonaceous material holding, therethrough disseminated, thereto adherent, minute particles of titanic material, such as titanic oxid, which are thus, by reason of the porosities, rendered readily accessible by gas. After the devolatilizing, or coking, operation is complete, the cinder is cooled by quenching, or otherwise, out of contact with the air.

My titanic cinder thus produced possesses many distinguishing advantages for use in production of titanium tetrachlorid. Among these are notable:—its capacity for being mechanically crushed, to any size, adapted to the particular furnace employed, without crumbling so as to produce an undesirable amount of finely powdered material; also its hardness and rigidity whereby it may be charged to fill completely any form, size, or type of furnace without compacting undesirably, and without, during any part of the operation, crumbling to produce powder so light as to be undesirably blown out by the flow of chlorin. On the contrary, the fragments of my cinder, however large or small, retain their original form and structure even after complete exhaustion of their titanic oxid and remain even then still sufficiently strong to support their own aggregated weight even in large furnaces of the vertical shaft type, thus all former objectionable clogging and resulting ill effects are throughout my operation completely avoided.

Another important and beneficial feature of my titanic cinder is the unprecedentedly large surface of titaniferous material thereby exposed to free circulation thereover, and therethrough, of the chlorin, this resulting in an increased rapidity, thoroughness and economy of operation whereby the highest chlorin efficiency is attained. Moreover, the intimacy and homogeneity of the mixture of carbon and titanic oxid resulting from my procedure renders possible a nearly complete extraction of the titanium as tetrachlorid.

Having thus, as a preliminary, essential, step in my process, prepared my titanic cinder, I obtain therefrom my final tetrachlorid product by subjecting it to the action of the usual stream of chlorin gas which, owing to the aforesaid physical and other characteristics of the cinder, can well be done in any type or form of apparatus hitherto employed for such purposes as will be well understood by those skilled in the art.

The novel, distinctive characteristics of my cinder as a means for improving the operation admit, moreover, of certain beneficial variations in hitherto apparently indispensable conditions. For example my invention admits of substantial reduction in the comparatively high temperatures at which the titaniferous charges have heretofore been maintained during the reaction, i. e. above 800° C., as evidenced by the "full" or "bright" redness prescribed, as above referred to. I have discovered that, when operating by aid of my titanic cinder, the titanium tetrachlorid reaction starts when the cinder is barely visibly red, and proceeds with entirely satisfactory rapidity while the temperature is maintained at as low as about 650° C. or in any case not to exceed 750° C. The importance of being thus able to produce the required reactions at such comparatively lower temperatures follows from the fact that thereby only titanium tetrachlorid is at first formed and distilled over, the distillation over of ferric chlorid not beginning until the cinder is nearly exhausted of its titanium contents. The products of reaction can thus be sorted, i. e. collected in two or more lots, the first of which in the order of production will consist, as is for some purposes preferable, of exceptionally pure titanium tetrachlorid, negligibly, if at all, contaminated by admixture of iron compounds. A further advantage of operating at such lower temperatures is that a relatively large percentage of other impurities such as silica, alumina, etc., inherent in the titaniferous material employed, remain in the apparatus or furnace employed with other residues of the chlorin reaction; while it goes without saying that such lower temperatures also tend to comparatively prolong the life of the apparatus employed, and, in any case, to promote economy.

Having now described my invention, what I claim as new and desire to secure by Letters Patent is the following:

1. The method of producing titanium tetrachlorid ($TiCl_4$) which comprises mixing together a titaniferous material and a carbonaceous material containing volatile matter, heating the mixture until devolatilized, and subjecting the resulting cinder to the action of chlorin.

2. The method of producing titanium tetrachlorid ($TiCl_4$) which comprises mixing together titanic oxid and a carbonaceous material containing volatile matter, heating the mixture until devolatilized, and subjecting the resulting cinder to the action of chlorin.

3. The method of producing titanium tetrachlorid ($TiCl_4$) which comprises mixing together a titaniferous material and soft coal, heating the mixture until devolatilized, and subjecting the resulting cinder to the action of chlorin.

4. The method of producing titanium tetrachlorid ($TiCl_4$) which comprises mixing together titanic oxid and soft coal, heating the mixture until devolatilized, and subjecting the resulting cinder to the action of chlorin.

5. The method of producing titanium tetrachlorid ($TiCl_4$) which comprises mixing together a titaniferous material and a carbonaceous material containing volatile matter, heating the mixture until devolatilized, and subjecting the resulting cinder to the action of chlorin at not to exceed 750° C.

6. The method of producing titanium tetrachlorid ($TiCl_4$) which comprises mixing together titanic oxid and a carbonaceous material containing volatile matter, heating the mixture until devolatilized, and subjecting the resulting cinder to the action of chlorin at not to exceed 750° C.

7. The method of producing titanium tetrachlorid ($TiCl_4$) which comprises mixing together a titaniferous material and soft coal, heating the mixture until devolatilized, and subjecting the resulting cinder to the action of chlorin at not to exceed 750° C.

8. The method of producing titanium tetrachlorid ($TiCl_4$) which comprises mixing together titanic oxid and soft coal, heating the mixture until devolatilized, and subjecting the resulting cinder to the action of chlorin at not to exceed 750° C.

9. As a new composition of matter the hereinbefore described cinder characterized as consisting essentially of a hard, rigid, porous, uncompressed, sintered magma of devolatilized carbonaceous material containing therein disseminated thereto adherent and thereby supported titaniferous material.

10. As a new composition of matter coke containing therein disseminated titanic oxid.

LOUIS E. BARTON.

Witnesses:
C. J. KINZIE,
P. P. EASTON.